(12) United States Patent
Finetti et al.

(10) Patent No.: US 7,959,851 B2
(45) Date of Patent: Jun. 14, 2011

(54) METHOD FOR FORMING STRIPS OF CONTAINERS

(75) Inventors: Primo Finetti, Mirandola (IT); Andrea Bartoli, Reggio Emilia (IT)

(73) Assignee: Sarong Societa' per Zioni, Reggiolo (IT)

( * ) Notice: Subject to any disclaimer, the term of this patent is extended or adjusted under 35 U.S.C. 154(b) by 1469 days.

(21) Appl. No.: 10/502,636

(22) PCT Filed: Jan. 20, 2003

(86) PCT No.: PCT/IB03/00122
§ 371 (c)(1),
(2), (4) Date: Jul. 26, 2004

(87) PCT Pub. No.: WO03/061945
PCT Pub. Date: Jul. 31, 2003

(65) Prior Publication Data
US 2005/0039849 A1    Feb. 24, 2005

(30) Foreign Application Priority Data

Jan. 24, 2002    (IT) .................................. MO02A0014

(51) Int. Cl.
| | |
|---|---|
| *B29C 39/14* | (2006.01) |
| *B29C 53/00* | (2006.01) |
| *B29C 37/00* | (2006.01) |
| *B29C 39/02* | (2006.01) |
| *B28B 11/12* | (2006.01) |
| *B29C 65/00* | (2006.01) |
| *B29C 49/00* | (2006.01) |

(52) U.S. Cl. ........ 264/558; 264/151; 264/157; 264/160; 264/527; 264/536; 156/381; 425/523

(58) Field of Classification Search .................. 264/558, 264/564, 151, 157, 160, 527, 536; 156/381; 425/523
See application file for complete search history.

(56) References Cited

U.S. PATENT DOCUMENTS

| | | | | |
|---|---|---|---|---|
| 2,122,254 | A | * 6/1938 | Kranich et al. | .................... 225/2 |
| 2,420,983 | A | * 5/1947 | Salfisberg | ........................ 53/436 |
| 2,918,698 | A | * 12/1959 | Hagen et al. | .................. 264/527 |
| 2,991,500 | A | 7/1961 | Norbert | |
| 3,111,874 | A | * 11/1963 | Grover et al. | .................... 83/107 |
| 4,907,394 | A | * 3/1990 | Tschepke et al. | ............... 53/412 |
| 5,223,073 | A | * 6/1993 | Freddi et al. | .................. 156/381 |
| 5,669,208 | A | * 9/1997 | Tabaroni et al. | ................ 53/453 |

FOREIGN PATENT DOCUMENTS

| | | | |
|---|---|---|---|
| EP | 19005 | A1 * | 11/1980 |
| EP | 0 479 152 | A | 4/1992 |
| EP | 0 692 428 | A | 1/1996 |
| WO | 94/08852 | A | 4/1994 |

* cited by examiner

*Primary Examiner* — Monica A Huson
*Assistant Examiner* — Michael T Piery
(74) *Attorney, Agent, or Firm* — Nixon & Vanderhye P.C.

(57) ABSTRACT

Strips containers are formed using two continuous webs in thermoformable and heat-sealable material facing each other. The webs are indexed along a feed line through different operating stations that transform the webs into a continuous strip of containers, each one of which is provided with a mouth. The containers are arranged according to two parallel rows that are opposed to a longitudinal median zone. The mouths of the containers of the upper row are arranged on the upper longitudinal edge of the strip and face upwards, whilst the mouths of the containers of the lower row are arranged on the lower longitudinal edge and face downwards. The method enables productivity to be increased and waste to be reduced.

11 Claims, 3 Drawing Sheets

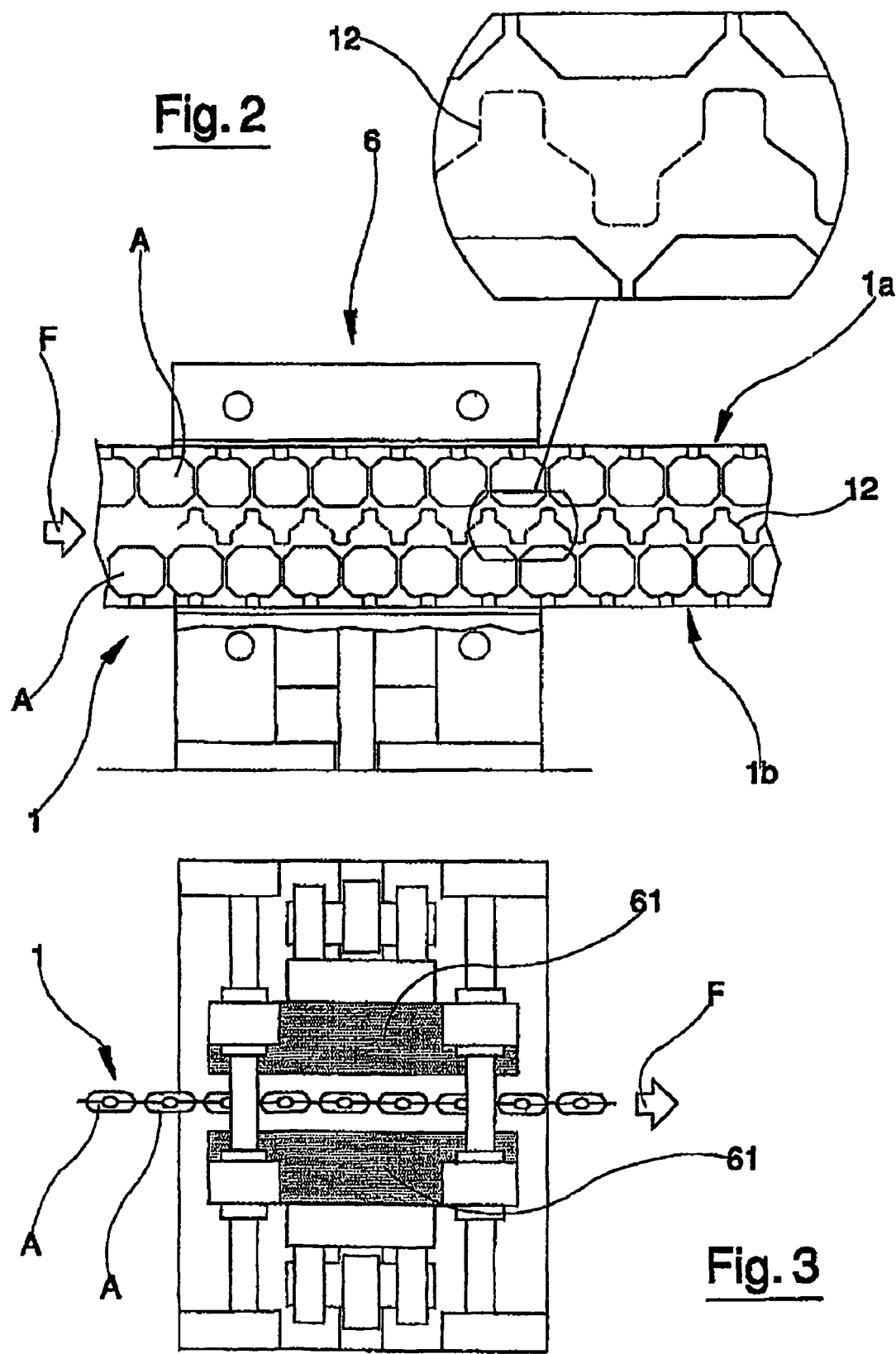

METHOD FOR FORMING STRIPS OF CONTAINERS

This application is the US national phase of international application PCT/IB03/00122 filed 20 Jan. 2003, which designated the US and claims priority to IT Application No. MO2002A000014 filed 24 Jan. 2002. The entire contents of these applications are incorporated herein by reference.

BACKGROUND AND SUMMARY OF THE INVENTION

The object of the present invention is a method for forming strips of containers.

Specifically, but not exclusively, the present invention can be used for forming one or more continuous strips of containers in a heat-sealable and thermoformable plastic material.

It is already known to form continuous strips of containers by means of indexing two webs facing each other to a series of operating stations that transform the webs into at least one strip of containers.

The operating stations may comprise, for example, one or more preheating stations to preheat the two webs in heat-sealable and thermoformable material facing each other, a sealing station in which the webs are heat-sealed in preset areas in order to obtain alveoli provided with a mouth, and a thermoforming station in which the alveoli are expanded into suitable forming cavities by injecting a forming fluid into the alveoli through the mouths. Patent IT 1243064 shows an example of a method of this kind.

Several different aspects of the known methods can be improved, in particular in terms of productivity increase and reject reduction.

An object of the present invention is to improve known methods, especially the aforementioned aspects thereof.

One advantage of the invention is to provide a method through which it is possible to obtain, per time unit, a relatively high number of containers arranged in a continuous strip. Another advantage of the invention is to allow forming containers, by means of the transformation of at least two continuous webs of film material, in such a way that the material that makes up the finished product constitutes a very high percentage of the material of the webs that were used at the outset.

A further advantage of the invention is to reduce the number of rejects.

Yet another further advantage is to provide a method that is relatively simple and cheap.

BRIEF DESCRIPTION OF THE DRAWINGS

Further features and advantages of the present invention will better appear from the following detailed description of an embodiment of the invention, illustrated, by way of example and not of limitation, in the accompanying Figures.

FIG. 2 is a continuation of FIG. 1.

FIG. 3 is a plan view from above of FIG. 2.

DETAILED DESCRIPTION OF THE INVENTION

Figure 1:
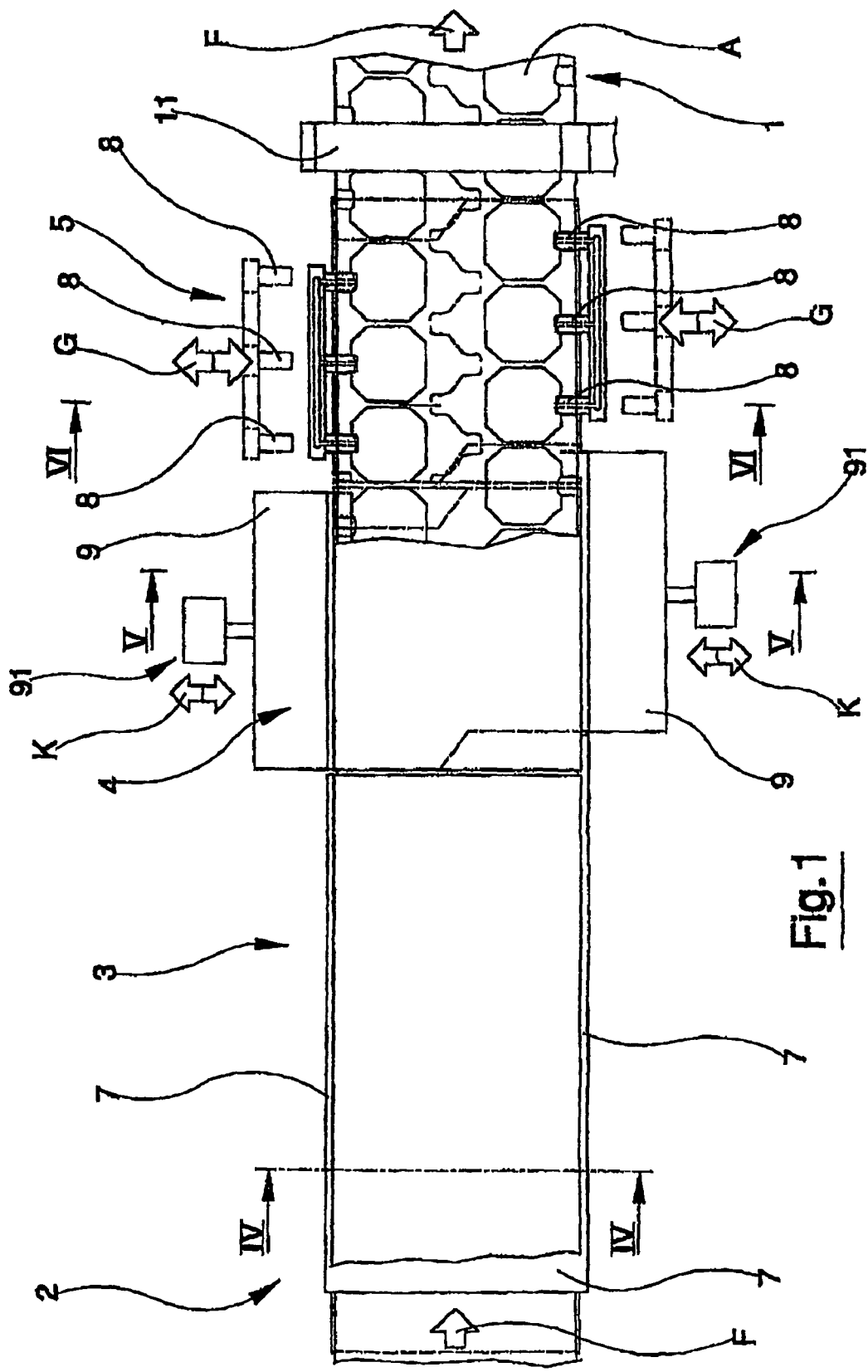
FIG. 1 shows a lateral view, in vertical elevation, of a section of a production line of the strip of containers obtained according to the invention.
Figure 4:
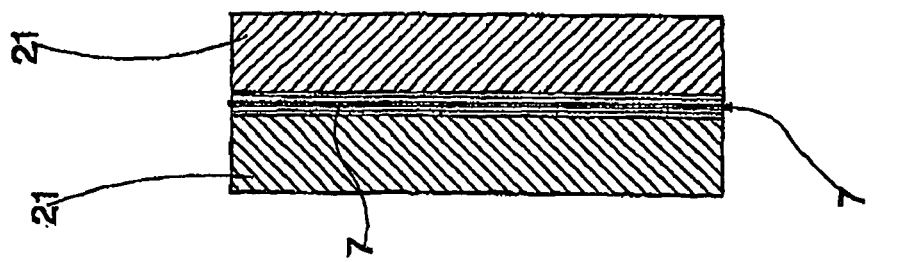
FIG. 4 is the cross-section IV-IV of FIG. 1.

With reference to the above-mentioned Figures, reference number 1 indicates a continuous strip of containers in which the strip has a preset width and an undefined length and in which the containers A are arranged into two longitudinal rows opposite each other in relation to a median longitudinal zone.

The strip 1 is formed from a pair of continuous webs of film material. In the preferred embodiments, two webs in heat-sealable and thermoformable plastic material are used. The two webs are unwound from reels and are indexed (using a known advancing arrangement), along a feed line that crosses different operating stations, facing each other, with a preset constant advancing step and with an advancing direction F that could be horizontal. The operating stations transform the webs into the continuous strip of containers. The operating stations in the preferred embodiments comprise at least: one or more preheating stations 2 and 3 (two in the described case) in which the webs are prepared for the next and immediately contiguous sealing station 4 in which the preheated webs are heat-sealed in preset areas in order to obtain alveoli, each one of which is provided with a mouth; the next, immediately contiguous, station, is a forming station 5 in which the alveoli are expanded within forming cavities by means of blowing a forming fluid that is injected through the mouths of the alveoli; and the following station, that is separated from the forming station and shown in FIGS. 2 and 3, is a cutting station 6 in which the strip is longitudinally cut at the median longitudinal zone in order to obtain two half-strips, 1a and 1b, which are one separated from the other and which are moved towards any subsequent operation.

The preheating stations 2 and 3, the sealing station 4, the forming station 5 and the cutting station 6, each comprise a pair of opposed elements (half-moulds), which can be operated to open and close in a way that is coordinated with the indexing of the webs so as to perform the above mentioned operations on the webs.

Reference number 21 indicates the preheating half-moulds. Reference number 7 indicates a protective barrier separating one web from the other at the preheating station. The barrier is constituted, for example, by means of a continuous vertical solid wall.

As mentioned, the sealing station comprises two sealing half-moulds 41 facing each other from opposite parts in relation to the advancing direction of the webs. The half-moulds 41 are arranged to seal the two webs together so as to define two rows of alveoli, these two rows being opposite in relation to the web longitudinal median zone. The median zone is, at least partially, affected by sealing.

Each alveolus of a row is open in the direction of a respective longitudinal edge of the webs, whereas each alveolus of the opposite row is open in the direction of the opposite longitudinal edge of the webs.

Figure 5:
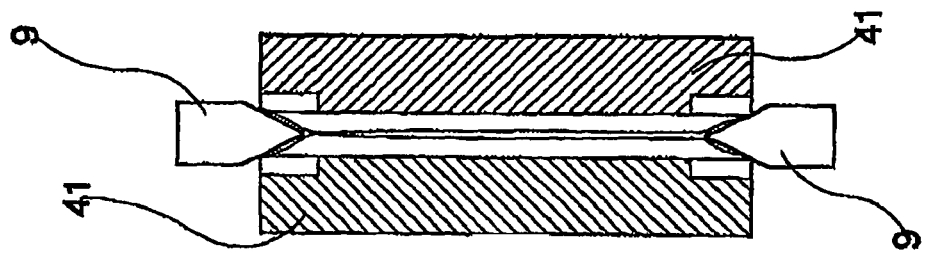
FIG. 5 is the cross-section V-V of FIG. 1.
Figure 6:
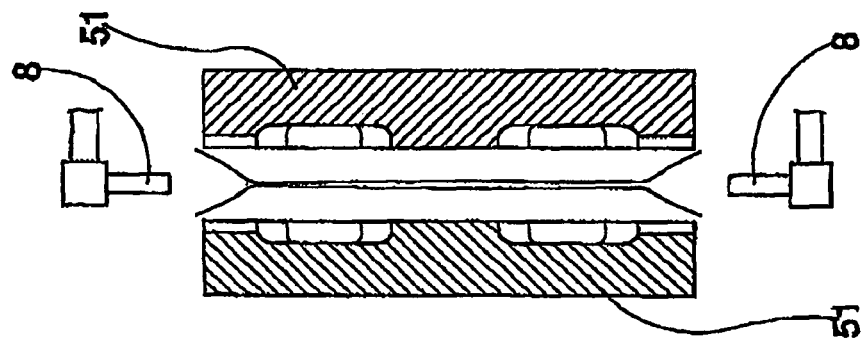
FIG. 6 is the cross-section VI-VI of FIG. 1.
Figure 7:
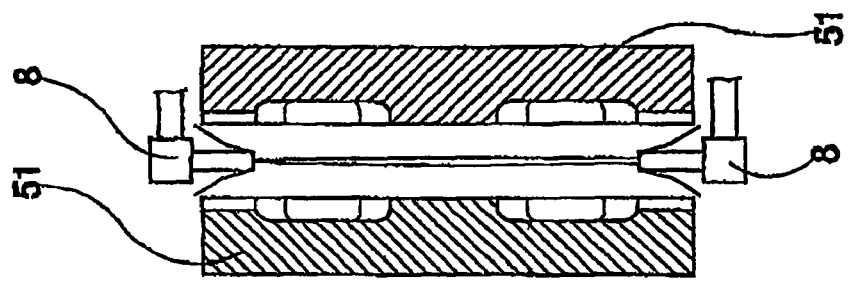
FIGS. 7 and 8 shows the cross-section of FIG. 6 in two different operating configurations.

At the sealing station 4 are arranged at least two opposed separators 9, one of which is arranged to engage between the two open borders of the alveoli located on one longitudinal edge of the two longitudinal edges of the webs, and the other one of which is arranged to engage between the two open borders located on the opposite longitudinal edge of the two longitudinal edges of the webs. Each separator 9 (an upper one and a lower one), extending lengthwise along the sealing station 4, has a wedge-shaped end that is inserted between the two borders of the alveoli at the sealing station. The sealing half-moulds (FIG. 5) have, in correspondence with the two separators 9, two opposed chambers for housing the part of the separators 9 that protrudes inside the half-moulds.

Each separator 9 is movable towards and away from the longitudinal median zone of the moving webs in both ways along the direction K, so as to take up an active approach position in which the separators 9 press the borders of the alveoli to keep them separated (this position, in which the half-moulds are closed on the webs to be sealed, is taken up during the sealing operation), and an inactive distancing position (FIG. 5), in which the separators 9, although remaining inside the borders of the alveoli, are slightly withdrawn and do not press on the borders (this position is taken up when the sealing half-moulds are open and the webs are advanced along the feed line). Common axial fluidic actuators control the movement of the separators. The two separators 9, one of which is associated with a longitudinal edge of the web and the other is associated with the opposite longitudinal edge, are operated in a coordinated manner, for example by means of two axial fluid actuators 91, they can also be actuated simultaneously.

Figure 8:
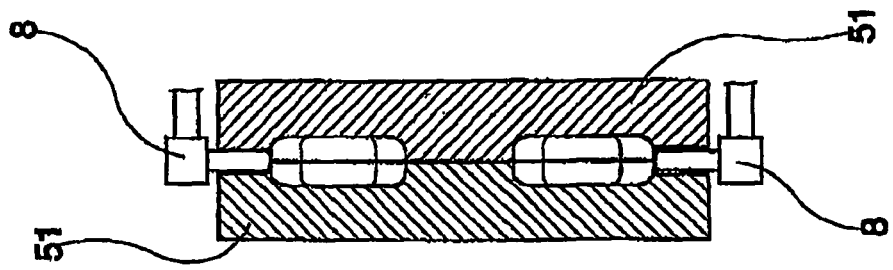

At the forming station are provided two forming half-moulds 51 that define, in a closed position (FIG. 8), two rows of forming cavities (an upper one and a lower one) within which the alveoli are expanded. The forming station 5 is provided with two opposed nozzle units 8 (an upper one and a lower one) for injecting a forming fluid. The nozzle units 8 are so arranged that one nozzle unit works on a longitudinal edge of the webs and the other one works on the opposite longitudinal edge. The nozzles 8 of each nozzle unit are placed in a row, substantially on the same lying plane as the nozzles 8 of the other nozzle unit, this lying plane substantially coincides with the lying plane (vertical in this case) of the facing webs that are being processed.

The nozzles 8 of each unit which are placed in a row, are spaced one from the other by a step corresponding to the step of the containers in such a way that each nozzle can be operationally associated with a corresponding forming cavity. The blowing nozzles 8 of a nozzle unit (e.g. the upper unit) face a side (upper one) of the forming half-moulds 51 that grips the borders of a longitudinal edge of the webs (upper one); analogously, the nozzles 8 of the other unit (the lower one) face the opposite side (lower one) of the forming half-moulds 51 that grips the borders of the opposite longitudinal edge. The upper and the lower nozzle units 8 are provided to be inserted between the two borders of the upper webs and, respectively, of the lower webs, in correspondence of the alveoli obtained in the previous sealing station 4.

The axes of the injection nozzles 8 are parallel one with the other (the nozzles of a unit deliver the forming fluid in a delivering sense that is opposed to the delivering sense of the nozzles of the other unit) and they are positioned in a direction that is substantially perpendicular to the advancing direction F of the webs and they are positioned substantially on the same plane as the webs themselves. The nozzles 8 of a unit are supported by a single support body that can be operated to move in a direction G, perpendicular to the advancing direction F of the webs, so as to insert and remove the nozzles into and out of the relative borders (upper one or lower one) of the webs. In each support body (upper one or lower one) is provided a channel that can be connected with a source of the forming fluid and that feeds the nozzles. Each nozzles unit and its operation are substantially the same as known blowing nozzles.

The forming half-moulds 51 have, on the two opposite upper and lower sides, seats that are conformed and arranged to house the nozzles 8 inserted between the respective borders. When the half-moulds are closed (FIG. 8) the seats press the borders onto the nozzles 8. Closing the forming half-moulds 51, also because the seats close on the borders of the webs and on the nozzles (both on the upper longitudinal edge and on the lower longitudinal edge), creates a seal between the nozzles, the webs and the half-moulds (FIG. 8), particularly during the phase of injection of the forming fluid. The forming fluid causes the thermoforming by means of the expansion of the alveoli inside the forming cavities.

The thereby expanded alveoli form the containers A arranged in two opposed rows on a continuous strip 1 which is conveyed along the advancing direction F to the longitudinal cutting station 6 (FIG. 2). The containers are formed on the strip (whose flat part is in a vertical position) in two parallel rows in which the containers of a first row (the upper one) have the mouths that are arranged on a first (upper) edge of the strip and that point one way (upwards), whilst the containers of the second row (lower) have the mouths that are arranged on a second edge (lower one) opposite the first and that point the opposite way (downwards) in relation to the mouths of the containers of the first row. On each row, the containers A are arranged contiguously to each other. Between two adjacent containers A may be provided a sealing area for sealing the two webs whereat, in a subsequent phase, transversal cutting takes place to divide the containers singularly (or into portions). The shape of the containers A is substantially the same as for the first and the second row. The containers A in each row are arranged at a substantially constant step. The step of the containers may be understood to be the distance, taken along the direction of the length of the strip, between the mouths of two adjacent containers, or (if the containers have the same shape) the distance between two any another corresponding points of two adjacent containers, or the distance between the preset cutting zones whereat the containers can be subsequently separated from one another. The step of the containers is the same for both rows. The containers of one row are arranged substantially staggered by half a step in relation to the containers of the other row, as shown in FIGS. 1 and 2.

Reference number 11 indicates a gripper that provides, in known manner, the indexing of the strip 1.

The strip of containers, arranged in a double row, is fed to the cutting station 6 (FIG. 2) in which the two rows are divided from each other in the median zone by means of a longitudinal cutting. The cutting station 6 comprises two cutting half-moulds 61 that are opposed one to the other and that cooperate. The strip, being still indexed with an advancing step that can be the same as an integer multiple of the step of the containers, passes between the two half-moulds that cyclically close in order to longitudinally cut a section of the strip after each indexing of one step of the strip and that open before the next advancing of a step.

The longitudinal cutting occurs along a shaped continuous cutting line 12 (highlighted in FIG. 2) arranged in the central zone of the strip comprised between the two rows of containers. The cutting line 12 consists of a stroke that repeats itself indefinitely step-by-step in the advancing direction. The stroke of the cutting line that repeats itself has a step that is the same as the step of the containers. At the cutting station at each work cycle (opening and closing of the half-moulds) a portion of the strip is cut along a stroke of cutting line the length of which is roughly the same as an integer multiple of the length of the step of the containers.

The cutting line is shaped in such a way as to divide the strip into two continuous half-strips 1a and 1b, each one of which comprises a row of containers. The half-strip 1a, that comprises the upper row of containers A, has a cut edge (the lower one), which can be superimposed, at least for its most part, on the (upper) cut edge of the other half-strip 1b (the lower one). The two half-strip 1a and 1b are substantially the same as one another.

The cutting line crosses the strip along a central sealing zone, which is a substantially flat zone in which, at the heat-sealing station, the two webs which form the strip have been at least partially sealed; this central zone is furthermore a zone that was not occupied by alveoli and which is not currently occupied by the swollen part of the containers, suitable for containing a product, where, at the forming station 5, the expansion of the alveoli has taken place. The cutting operation could take place in this central zone in such a way as the cutting does not create a further opening of the part of the containers suitable for containing a product that would be in the opposite part of the already obtained openings (mouths). Each container A, after the longitudinal cutting, has on one side a flat part, which is not suitable for containing a product, that can be used to perform certain functions: for example, the part can act as a handle, or can be the zone in which is placed the tang for aided opening of the container, etc. The fact that the two rows of containers A are staggered (where the "staggering" is understood to refer to the step of the containers and to corresponding points or, if the shape of the containers is not the same between the two rows, to substantially corresponding points of the containers) enables full use of the central part of the strip comprised between the two rows of containers, thereby minimising the reject parts of material.

Downstream of the longitudinal cutting station 6 can be arranged other operating stations to perform other operations (of the known type: e.g. filling, sealing, any cooling, transversal severing into portions) on the containers arranged on the two strips obtained by longitudinal cutting of the original strip. In particular, it is possible to provide for (at the transversal severing station or at another station) trimming of the edges of the containers and eliminating of any undesiderable reject parts in order to obtain the definitive shape of the containers: this operation, when performed (it might not be necessary), nevertheless causes the removal of an extremely reduced amount of material.

In the central part of the strip, whereby longitudinal cutting occurs, the cutting line is shaped with transversal strokes in such a way that each of the resulting two half-strips 1*a* and 1*b* has at least a cut part laterally arranged (with reference to the direction of the length of the strip) in relation to a cut part of the other half-strip. Substantially, the shaped longitudinal cutting line defines, in this central zone, a series of protruding parts that are next to one another and belong alternately to the one and the other of the two half-strips (as shown in FIG. 2).

In the longitudinal median zone, after the longitudinal cutting, each container of a row has, towards the centre, a non-swollen end that is comprised between the non-swollen ends facing the centre of two adjacent containers of the opposite row. A sort of superimposing or interpenetration is substantially provided (in the direction that is transverse to the length of the strip) between the non-swollen ends of the different containers facing the median zone of the strip. The non-swollen end of each container, which is placed in the centre of the strip, is situated very near the swollen alveoli of two containers of the opposite row. Thanks to this configuration, the width of the central part of the strip can be relatively reduced; and the material of this central part is fully or almost fully exploited, without rejects or with minimal rejects. In order to further reduce the waste, the shaped outlines of the central ends of the different containers are drawn in such a way as to complement one another (in addition to that fact that they could be superimposed so as to produce containers that are the same as one another) so that a single cut is sufficient to obtain all or at least most of the outlines (so as to avoid subsequent trimming to touch up the outlines) of both of the containers of the one row and of the containers of the opposite row.

Many different practical applicational modifications of constructional details may be applied to the invention without thereby leaving the scope of the invention that is claimed below.

The invention claimed is:

1. A method for forming strips of containers, comprising:
   feeding intermittently at least two continuous webs, facing each other, along an advancing direction and with a preset advancing step along a feed line;
   transforming said webs into at least one continuous strip of containers, said containers being formed on said continuous strip into two parallel rows that are opposed with respect to a longitudinal median zone, each one of said containers being provided with at least one mouth, the mouths of the containers of a first row being arranged on a first longitudinal edge of said continuous strip and facing an opposite way from said longitudinal median zone, the mouths of the containers of a second row being arranged on a second longitudinal edge, opposite the first longitudinal edge, and facing an opposite way from the mouths of the containers of said first row, said containers being formed such that the containers of said first row are arranged substantially staggered in relation to the containers of said second row; and
   feeding said continuous strip to a cutting station in which said two rows are divided from each other by means of a longitudinal cutting along a continuous shaped cutting line that is arranged in a central zone of said continuous strip, said central zone being comprised between said two rows of containers, said shaped cutting line comprising a stroke that repeats itself step-by-step indefinitely in said advancing direction, said containers being formed on each row at a substantially constant step that is the same for both rows, the containers of said first row being arranged substantially staggered by a half step in relation to the containers of said second row, said continuous shaped cutting line crossing said continuous strip along a substantially flat zone of said central zone not occupied by a swollen part of said containers suitable for containing a product in such a way that said longitudinal cutting does not create a further opening of a part of said containers suitable for containing a product, said continuous shaped cutting line defining a series of protruding parts that are next to one another and belong alternately to the containers of the one and the other of the two half-strips; said cutting station comprising a pair of opposed cutting elements operated to open and close in a way that is coordinated with an indexing of said strip which is indexed with an advancing step and passes between said two cutting elements that cyclically close in order to longitudinally cut a section of the strip after each indexing of one step of the strip and that open before the next advancing of a step, wherein in said cutting station, said strip being longitudinally cut at said central zone in order to obtain two continuous half-strips each one of which comprises one row of containers, said two half-strips being moved towards at least one subsequent operation.

2. The method of claim 1, wherein downstream of said longitudinal cutting station an operating station is arranged to perform a transversal cutting to divide the containers singularly or into portions.

3. The method of claim 1, wherein said stroke of said cutting line repeats itself with a step that is the same as a step of said containers.

4. The method of claim 1, wherein each of said two continuous half-strips has a cut edge that can be superimposed on the cut edge of the other half-strip.

5. The method of claim 1, comprising feeding said webs to a forming station in which two nozzle units, operating on the two opposite longitudinal edges of said webs, are inserted between two pairs of opposite borders of said webs, both on a longitudinal edge and on the opposite longitudinal edge of said two webs, and injecting between said two webs a forming fluid that causes said webs to expand within forming cavities defined by two forming half-moulds closed on the webs.

6. The method of claim 5, comprising inserting said nozzles between said borders, both on one and the other longitudinal edge, with an insertion movement in a direction that is substantially perpendicular to said advancing direction of said webs and parallel to a lying plane of said webs, said nozzles of each unit having a step arrangement, the step and the distribution of the nozzles being respectively corresponding to those of the containers of the corresponding row.

7. The method of claim 5, wherein before said forming station, the method comprises separating said pairs of opposed borders by a separating device arranged to operate on both longitudinal edges of said webs.

8. The method of claim 6, wherein before said forming station, the method comprises separating said pairs of opposed borders by a separating device arranged to operate on both longitudinal edges of the webs.

9. The method of claim 5, wherein after said nozzles have been inserted, the method comprises closing said forming half-moulds to define said forming cavities and to hermetically tighten said opposed borders against said nozzles both on the one and the other longitudinal edge.

10. The method of claim 1, comprising feeding said webs along said feed line through one or more operating stations that perform sad transforming step.

11. The method for forming strips of containers, comprising:
    feeding intermittently at least two continuous webs, facing each other, along an advancing direction and with a preset advancing step along a feed line;
    transforming said webs into at least one continuous strip of containers, said containers being formed on said continuous strip into two parallel rows that are opposed with respect to a longitudinal median zone, each one of said containers being provided with at least one mouth, the mouths of the containers of a first row being arranged on a first longitudinal edge of said continuous strip and facing an opposite way from said longitudinal median zone, the mouths of the containers of a second row being arranged on a second longitudinal edge, opposite the first longitudinal edge, and facing an opposite way from the mouths of the containers of said first row, said containers being formed such that the containers of said first row are arranged substantially staggered in relation to the containers of said second row; and
    feeding said continuous strip to a cutting station in which said two rows are divided from each other by means of a longitudinal cutting along a continuous shaped cutting line that is arranged in a central zone of said continuous strip, said central zone being comprised between said two rows of containers, said shaped cutting line comprising a stroke that repeats itself step-by-step indefinitely in said advancing direction, said containers being formed on each row at a substantially constant step that is the same for both rows, the containers of said first row being arranged substantially staggered by a half step in relation to the containers of said second row, said continuous shaped cutting line crossing said continuous strip along a substantially flat zone of said central zone not occupied by a swollen part of said containers suitable for containing a product in such a way that said longitudinal cutting does not create a further opening of a part of said containers suitable for containing a product, said continuous shaped cutting line defining a series of protruding parts that are next to one another and belong alternately to the one and the other of the two half-strips; said cutting station comprising a pair of opposed cutting elements operated to open and close in a way that is coordinated with an indexing of said strip which is indexed with an advancing step and passes between said two cutting elements that cyclically close in order to longitudinally cut a section of the strip after each indexing of one step of the strip and that open before the next advancing of a step, wherein in said cutting station, said strip being longitudinally cut at said central zone in order to obtain two continuous half-strips each one of which comprises one row of containers, said two half-strips being moved towards at least one subsequent operation, wherein each container, after said longitudinal cutting, has a substantially flat zone of said central zone, said flat zone being a zone in which a tang for aided opening of the container is placed.

* * * * *